United States Patent [19]

Ng

[11] Patent Number: 5,146,325
[45] Date of Patent: Sep. 8, 1992

[54] VIDEO SIGNAL DECOMPRESSION APPARATUS FOR INDEPENDENTLY COMPRESSED EVEN AND ODD FIELD DATA

[75] Inventor: Sheau-Bao Ng, Plainsboro, N.J.

[73] Assignee: RCA Thomson Licensing Corporation, Princeton, N.J.

[21] Appl. No.: 692,868

[22] Filed: Apr. 29, 1991

[51] Int. Cl.⁵ .............................................. H04N 7/13
[52] U.S. Cl. ...................................... 358/135; 358/136
[58] Field of Search ....................... 358/135, 136, 133

[56] References Cited

U.S. PATENT DOCUMENTS

| | | | |
|---|---|---|---|
| 4,837,618 | 6/1989 | Hatori | 358/136 |
| 4,942,465 | 7/1990 | Ohta | 358/135 X |
| 5,040,061 | 8/1991 | Yonemitsu | 358/135 |
| 4,802,0065 | 1/1989 | Iinuma et al. | 358/135 |

Primary Examiner—Victor R. Kostak
Attorney, Agent, or Firm—Joseph S. Tripoli; Eric P. Herrmann; Ronald H. Kurdyla

[57] ABSTRACT

In a video decompression system for decompressing compressed image data wherein odd and even fields of video signal are independently compressed in sequences of intraframe and interframe compression modes and interleaved for transmission, the odd and even fields are independently decompressed. During intervals when valid decompressed odd/even field data is not available, even/odd field data is substituted for the unavailable odd/even field data. Independently decompressing the even and odd fields of data and substituting the opposite field of data for unavailable data may be used to advantage to reduce image display latency during system start-up and channel changes.

9 Claims, 7 Drawing Sheets

VIDEO SIGNAL DECOMPRESSION APPARATUS FOR INDEPENDENTLY COMPRESSED EVEN AND ODD FIELD DATA

This invention relates to apparatus for decompressing compressed video data as for recording or transmission.

BACKGROUND OF THE INVENTION

Over the past two decades significant effort has been committed to the compression of digitized video signals for purposes of image storage and transmission. As a result many types of compression techniques have evolved including the use of discrete cosine transforms, sub-band encoding, pyramid transforms, intraframe encoding, interframe encoding and combinations of the above to name a few. More recently the International Organization for Standardization has developed a video compression standard for use in video storage applications, e.g., CD-ROM. This proposed standard is described in the document "Coding of Moving Pictures and Associated Audio", ISO-IEC JTC1/SC2/WG11, MPEG 90/176 Rev. 2; Dec. 18, 1990. Hereinbelow this system will be referred to as MPEG.

A feature of the MPEG standard is the use of both intraframe and interframe coding techniques in combination with discrete cosine transforms, run length encoding and statistical (Huffman) encoding. Intraframe encoding in general terms involves the encoding of an image frame from a single source frame to provide sufficient encoded data for reconstruction of an image from only the intraframe encoded data. Interframe encoding is the generation of encoded frame data from, for example, the differences between information from a current source frame and a frame predicted from prior frames. As such images may not be reconstructed from a frame of interframe encoded data without information from prior frames. The MPEG system incorporates two types of interframe encoding. The first develops predictive frames (designated P frames) from the current frame and a single prior frame. The second develops bidirectionally predictive frames (designated B frames) from the current frame and one or both of a prior and a subsequent frame. For example, assume that frames occur in a sequence F1, F2, F3, F4 . . . and that frame F1 is to be intraframe encoded (designated I frame), frames F2 and F3 are to be B frame encoded and frame F4 is to be P frame encoded. The P encoded frame is developed from differences between frame F4 and a predicted frame generated from a decoded version of I frame F1 only. The B encoded frame representing frame F2 (F3) is developed from differences between frame F2 (F3) and predicted frames generated from both a decoded version of I frame F1 and a decoded version of P frame F4. Exemplary circuitry for generating I, B and P encoded frames is described in "A Chip Set Core for Image Compression", by Alvin Artieri and Oswald Colavin, available from SGS-Thomson Microelectronics, Image Processing Business Unit, 17 avenue des Martyrs-B.P. 217, 38019 Grenoble Cedex France.

An exemplary sequence of I, B and P encoded frames is illustrated in FIG. 1A. In FIG. 1A the upper blocks correspond to odd fields of interlaced image data, and the lower blocks correspond to even fields of interlaced image data. The MPEG system protocol designates that only the odd fields of respective frames are to be encoded. The exemplary sequence includes 9 frames of I, B and P encoded data which sequences occur cyclically. The amount of encoded data of I frames is significantly greater than the amount of encoded data of P frames, and the amount of encoded data of B frames is less than that of encoded P frames. The number of P frames between I frames and the number of B frames between P or I and P frames is variable, i.e., it is user selectable within certain constraints. Nominally this selection is dependent upon the channel bandwidth and image content.

The level of encoding provided by the MPEG protocol (e.g., odd fields only and a continuous data transfer rate of 1.5M bits/S) is sufficient to produce acceptable images in the computer display environment. However, those skilled in the art of television signal processing will readily recognize that the MPEG protocol as defined will not provide images of current broadcast quality. It will also be recognized that minor modifications to the protocol will provide sufficient data to produce broadcast quality television images or even HDTV images. These changes include doubling the number of fields to be encoded as well as increasing the number of lines per field and the number of pixels per line. However, even with such modifications to the MPEG protocol, certain deficiencies will still exist to preclude acceptable performance with respect to image reception.

Regarding the TV environment, a first deficiency of the MPEG system is the timing latency of image production upon receiver turn on or channel change. An image cannot be reproduced until an intraframe encoded frame of data is available to the receiver. For the sequence of encoded frames shown in FIG. 1A, in the worst case, image reproduction has a latency of at least nine frame intervals. A second deficiency resides in the duration of image corruption due to corruption or loss of data in data transmission. That is, if data for an encoded I frame is lost or corrupted, the images reproduced during the succeeding eight frames will be in error, which error may become cumulatively worse over the interval.

Independently encoding the odd and even fields of image data such that intraframe encoded odd fields are located midway between intraframe encoded even fields can be utilized to significantly reduce the start-up interval and image reproduction during channel changes. In addition it provides signal information which may be utilized for signal error concealment.

The present invention is directed to apparatus for decompressing image data in which odd and even fields of image data have been independently encoded according to respective sequences of intra- and interframe compression modes.

SUMMARY OF THE INVENTION

Apparatus for receiving and decompressing compressed image data of the type wherein odd and even fields of image data are independently compressed according to respective sequences of interframe and intraframe encoding modes includes circuitry for independently decompressing said compressed odd and even fields of image data. The decompressed odd and even fields of image data are interleaved for display. Further circuitry is included for substituting odd field data for even field data when valid even field data is not available.

In a particular embodiment, for system start-up or channel changes, apparatus is included to provide an image representative signal for a predetermined interval, corresponding to one of the decompressed odd or even fields of data (to the exclusion of the other of the odd or even fields of data) for which the first intraframe encoded field is received.

DETAILED DESCRIPTION

The invention will be described in terms of the MPEG field/frame protocol, however it should be appreciated that it is applicable to any encoding format that provides cyclic sequences of intraframe and interframe compressed signal.

Figure 1A:
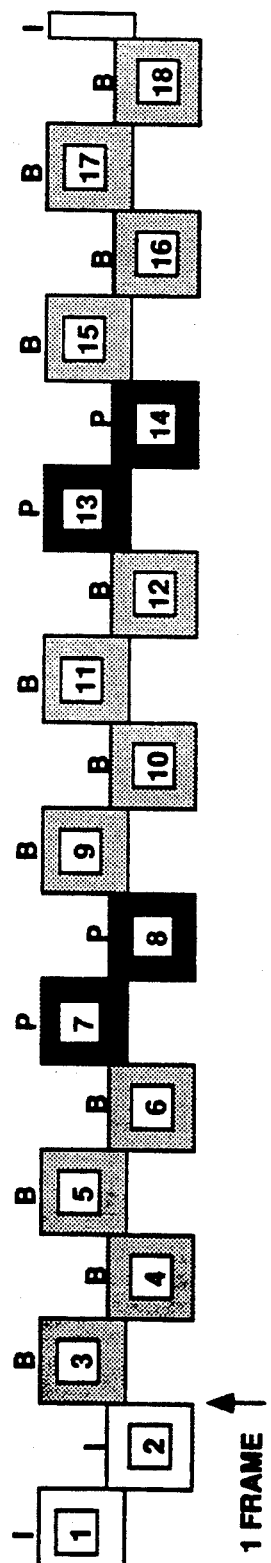
FIGS. 1A, 1B AND 1C are pictorial representations of encoded sequences of fields of video signal, useful for describing the invention.

Referring to FIG. 1A, the row of boxes corresponds to respective fields of encoded video signal. Even and odd numbered boxes correspond to even and odd fields respectively. The type of encoding applied to the respective fields (I, B or P) is indicated by the letter above each box. As indicated above, the sequence of odd fields corresponds to the MPEG protocol. Adding the even fields to the sequence, increasing the number of lines per field and the number of pixels per line modifies the protocol to provide sufficient information for television image reproduction.

Figure 1B:
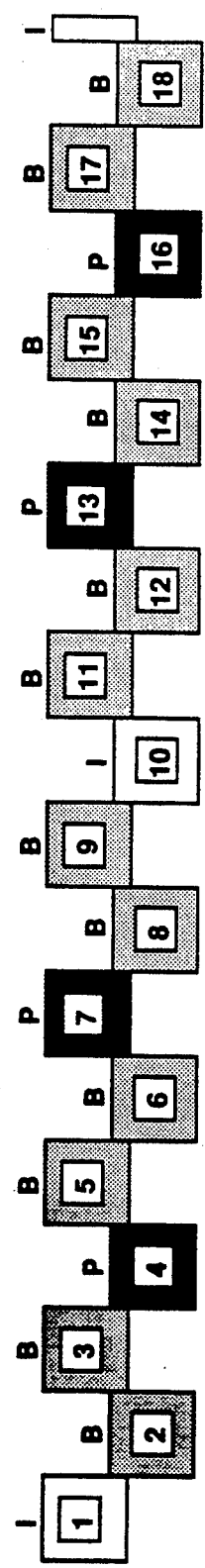

FIG. 1B illustrates an improved coding format, according to the invention, for reducing image reproduction latency and concealing signal transmission data loss or corruption. In FIG. 1B the even fields are encoded independently of the odd fields and the intraframe encoded fields are offset by approximately one half the number of fields in the cyclic sequence. The advantages that flow from the FIG. 1B sequence are as follows. To begin image reproduction an I field/frame is required. The sequence of FIG. 1B includes an I field/frame every 9 fields whereas the sequence of FIG. 1A includes an I field/frame only every 17 fields. Thus the FIG. 1B sequence provides signal entry points at intervals one-half as long as the intervals of the sequence of FIG. 1A, without increasing the amount of coded data. An image may be reproduced from only even field data or only odd field data, albeit with half vertical resolution. However, for providing images during channel scans (sequencing through channels), and at start-up, the rapidly reproduced lower resolution image is significantly more acceptable than waiting twice as long for a full resolution image. Regarding error concealment, assume that data is lost from a portion of the I fields 1 and 2 of FIG. 1A. This lost data will affect the reproduction of the images from fields 1-18, and may induce unacceptable image artifacts. Consider the loss of an equivalent amount of data from fields 1 and 2 of the sequence of FIG. 1B. Data lost from field 2 will only affect the reproduced image corresponding to field 2 since field 2 is bidirectionally predictive encoded. Data lost from the odd I field 1 has the potential of affecting all of the odd fields in the sequence, and thus corrupt all of the frames in the sequence. However, on detection of lost data in the odd field sequence, data from the even field sequence may be substituted for display. Such substitution will momentarily provide less image resolution, but this is far more acceptable than corrupted images.

Figure 1C:
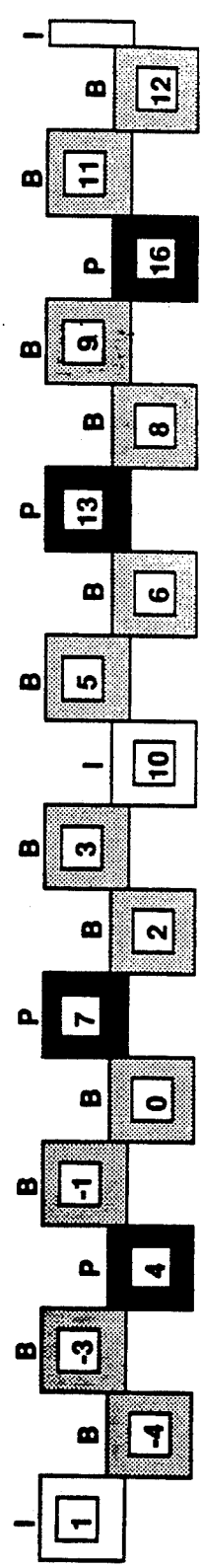

FIGS. 1A and 1B illustrate sequences of fields as they normally occur (disregarding the type of encoding). FIG. 1C illustrates a field sequence as it would be transmitted in an MPEG system. Recall that, for example, bidirectionally predictive encoded fields 3 and 5 are generated in part from I field 1 and P field 7. In order to decode the B fields 3 and 5, I field 1 and P field 7 must have been previously decoded. Therefore, to facilitate decoding and reduce the amount of data storage required in receivers, the encoded B fields are arranged to follow the occurrence of I and P fields from which decoding depends. This field transmission arrangement illustrated in FIG. 1C corresponds to the coding sequence of FIG. 1B.

Figure 2:
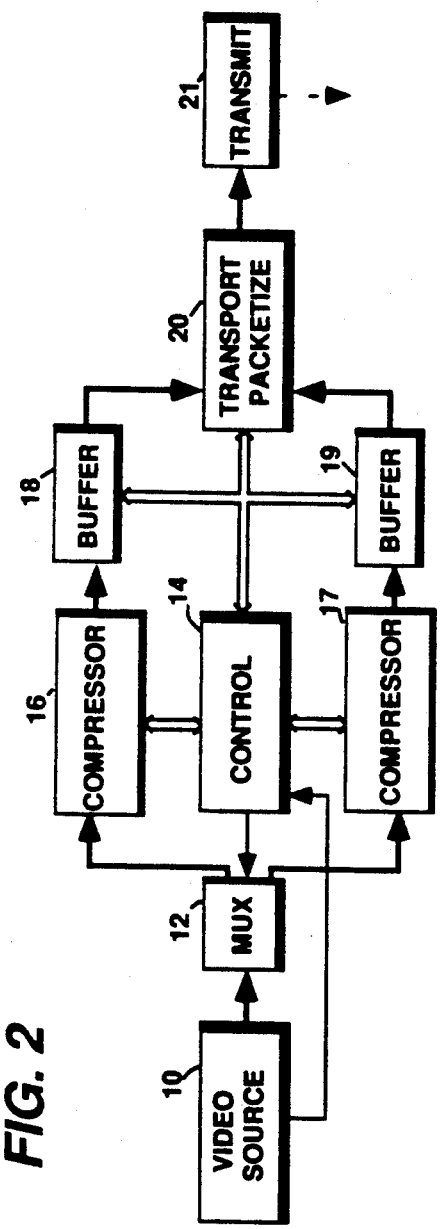
FIG. 2 is a block diagram of an exemplary video signal encoding system embodying the present invention.

Apparatus for encoding video signal according to, e.g., the field format of FIG. 1C is illustrated in FIG. 2. Video signal is provided by a source 10, which may include a video camera and preprocessing circuitry. The preprocessing circuitry provides fields of video signal according to an interlaced scan format and in pulse code modulated format (PCM). Typically the source 10 will provide luminance, Y, and chrominance, U and V, color difference signals, but for purposes of this disclosure they will be referred to jointly as the video signal. Nominally the luminance and chrominance signals are independently compressed or encoded and then combined for transmission, but those persons skilled in the art of video signal compression will be aware of these techniques and readily be able to implement same.

The video signal from the source 10 is coupled to a multiplexer 12 which passes even fields of video data to a first compressor apparatus 16 and odd fields of video data to a second compressor apparatus 17. The multiplexer 12 is controlled by a system control circuit 14, which is responsive to field interval timing signals provided by the video source 10.

Compressor 16 is conditioned by the control circuit 14 to compress respective even fields of video data according to a predetermined sequence of intraframe and interframe coding modes, e.g., I, B, P modes. Compressed video data is applied to a buffer memory 18. Compressed data from the buffer 18 is coupled to a transport packetizing circuit 20. The packetizing circuit 20 includes circuitry for parsing the data into blocks of predetermined amounts of data including header information to identify each block as well as information such as Barker codes for synchronizing the detection of respective blocks at corresponding receiver apparatus. The circuit 20 may also include error correction circuitry for appending error check codes to the data to be transmitted. The error correction circuitry may be in the form of a Reed-Solomon error correction encoder. The transport blocks are coupled to a transmitter 21 which may be simply a data bus or as complicated as a broadcast transmitter. In the latter instance the transport blocks of data may be conditioned to quadrature amplitude modulate (QAM) a carrier signal for application to a transmission antenna.

Compressor 17 is conditioned by the system controller 14 to compress the odd fields of video data according to a predetermined sequence of intraframe and interframe encoding modes, e.g., I, B, P. The mode sequence may be similar to the mode sequence applied to the even fields, or it may be an alternative sequence. In either event the mode sequence applied to the odd fields is selected so that intraframe encoded odd fields occur approximately midway between intraframe encoded even fields, or vice versa.

Compressed odd field video data provided by the compressor 17 is coupled to the transport packetizer circuit 20, via a buffer memory 19.

The transport packetizer circuit is conditioned by the control circuit 14 to alternately operate on even fields of compressed data provided by the buffer 18 and odd fields of compressed data provided by the buffer 19.

The buffers 18 and 19 are included because the amount of compressed data for respective fields differ according to the compression mode employed and the detail attendant the image represented by the field of video data. The differences in amounts of data result in fields of compressed data occupying different time intervals, and thus data output by the compressors 16 and 17 may not occur at convenient times for interleaving the odd and even fields of compressed data. The buffers provide accommodation for the differences in occurrence of the compressed data provided by the respective compressors.

The apparatus of FIG. 2 is shown with first and second separate compression circuits for compressing the even and odd fields of data. It should be appreciated that a single compressor may be employed to perform compression of both the even and odd fields.

Figure 3:
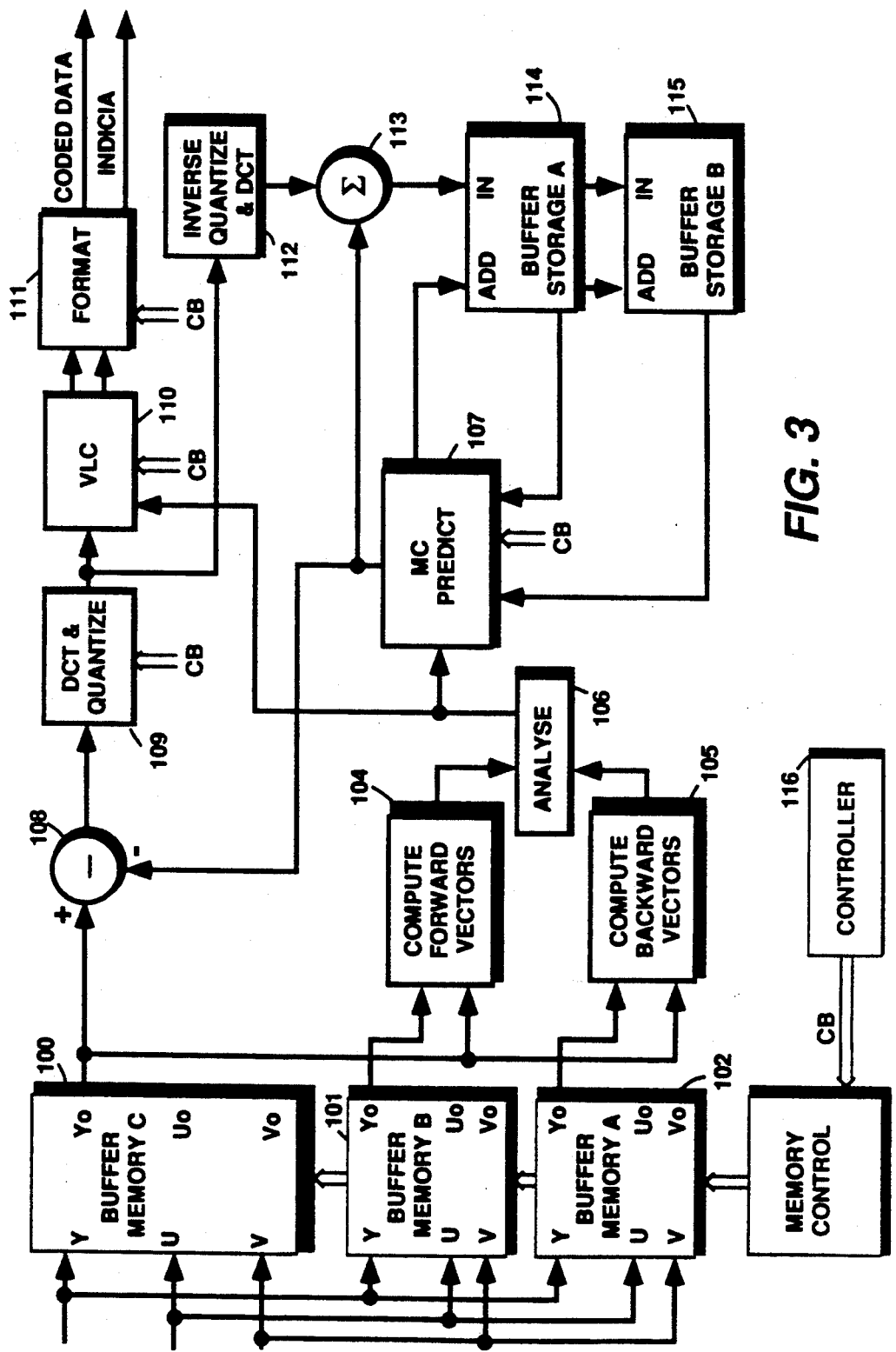
FIG. 3 is a block diagram of an exemplary video signal compression apparatus.

FIG. 3 illustrates an exemplary compressor apparatus which may be utilized for compressing both even and odd fields according to the sequence illustrated in FIG. 1C. The assumption is made that source fields of video signal have been rearranged to occur in the numbered sequence shown in FIG. 1C. The compressor provides compressed data according to I, B, P modes. Intraframe compression consists of performing discrete cosine transforms over 8×8 blocks of pixels and then variable length encoding the transform coefficients. Predictive compression (P fields) consists of determining motion vectors which indicate 16×16 blocks of pixels from a prior I field which most closely correspond to 16×16 blocks of pixels in the current field. A predicted field is generated using the motion vectors and data from the prior I field, and the predicted field is subtracted from the current field on a pixel by pixel basis to generate residues. A discrete cosine transform is then performed on 8×8 blocks of the residues. The transform coefficients of the residues are variable length encoded, and the motion vectors plus the residue coefficients are non additively combined to form coded P fields. Bidirectional predictive fields (B) are formed similarly to the P fields except that the motion vectors and corresponding residues are associated with both prior occurring and subsequent fields of video data.

The apparatus shown only includes the circuitry required to generate compressed luminance data. Similar apparatus is required to generate compressed chrominance U and V data. In FIG. 3 the memory and storage elements 101, 102, 114 and 115 are each arranged to store an odd field of data and an even field of data in separate memory sections. When an even (odd) field is being processed the sections of the respective memory and storage elements designated for storing even (odd) fields are accessed. In addition there are elements 104 and 105 designated as elements for computing forward and backward motion vectors respectively. Since whether a motion vector is forward or backward depends only upon whether the current field is analyzed with respect to a prior or succeeding field, both elements are realized with similar circuitry, and in fact both elements 104 and 105 alternate on a field/frame basis between generating forward and backward vectors. The elements 104 and 105 may be realized using integrated circuits of the type designated STI 3220 MOTION ESTIMATION PROCESSOR available from SGS-THOMSON MICROELECTRONICS. In order to achieve the necessary processing rates each of the elements 104 and 105 may comprise a plurality of such integrated circuits operating simultaneously on different areas of respective images.

Element 109 designated DCT & Quantize performs the discrete cosine transform and quantization of transform coefficients and may be realized using integrated circuits of the type designated STV 3200 DISCRETE COSINE TRANSFORM available from SGS-THOMSON MICROELECTRONICS. Element 109 may also be realized with a plurality of such devices operated in parallel to concurrently process different areas of the image.

Even and odd fields occur alternately and sequentially, and the compressor of FIG. 3 alternately compresses odd and even fields. Compression of even and odd fields is similar except for the relative sequence of intra and interframe compression modes. The sequence is programmed into the controller 116 for both even and odd field sequences, and communicated to the respective processing elements via a control bus CB. Since the compression function is conceptually the same for both even and odd field sequences, an explanation of only the even field compression will be provided below.

Refer to FIG. 1C and assume that even field 10 is currently available. Previously occurring even P field 4 has been snatched and stored in the even field section of the buffer memory B 101. In addition a previously generated predicted even field 4 has been stored in the even field section of one of the buffer storage elements 114 or 115. As field 10 occurs it is stored in the even field section of the buffer memory A, 102. In addition field 10 is applied to a working buffer memory 100. As field 10 occurs, appropriate blocks of image data are coupled from the memory 100 to the minuend input of a subtracter 108. During compression of the I fields the subtrahend input of the subtracter 108 is held at a zero value so that data passes through the subtracter 108 unaltered. This data is applied to the DCT and quantizer element 109 which provides quantized transform coefficients to elements 110 and 112. Element 112 performs inverse quantization and inverse DCT transformation of the coefficients to generate a reconstructed image. The reconstructed image is applied via an adder 113 to, and stored in, the even field section of one of the buffer storage elements 114 and 115 for use in compressing subsequent B and P fields. During compression of I frames no information is added (by adder 113) to the reconstructed image data provided by element 112.

Element 110 performs variable length encoding (VLC) of the DCT coefficients generated by element 109. The VLC codewords are applied to a formatter 111 which segments the data and appends appropriate header information to facilitate decoding. Coded data from element 111 is then passed to a further buffer memory (not shown). The formatter may also be arranged to provide field indicia to the transport packetizing circuit for generating corresponding transport block headers. Each of the elements 109, 110 and 111 are controlled by the system controller 116 to cyclically perform the appropriate operations at the appropriate times.

After the occurrence and compression of even field 10 and even field 6 (B) occurs and is loaded into buffer memory 100. Data from even field 6 is coupled to both of elements 104 and 105. Element 104, responsive to data from even field 6 stored in memory 100 and data from even field 4 stored in memory 101, calculates forward motion vectors for respective blocks of 16×16 pixels of image data. It also provides a distortion signal which is indicative of the relative accuracy of the respective forward motion vectors. The forward motion vectors and the corresponding distortion signals are coupled to an analyzer 106.

Element 105, responsive to data from field 6 stored in memory 100 and data from I field 10 stored in memory 102, generates backward motion vectors and corresponding distortion signals which are also coupled to the analyzer 106. Analyzer 106 compares the distortion signals against a threshold, and if both exceed the threshold, provides both the forward and backward motion vectors as the motion vector, and also provides a corresponding signal related to the ratio of the distortion signals. Upon reconstruction predicted images are generated using both forward and backward vectors and corresponding field data from which derived. An interpolated field is generated from the forward and backward predicted fields in accordance with the ratio of distortion signals. If the distortion signals for both the forward and backward motion vectors are less than the threshold, the motion vector with the corresponding lesser valued distortion signal is selected as the block motion vector.

After the motion vector has been determined, it is applied to the motion compensated predictor 107 which accesses the appropriate data block defined by the vector or vectors from the previously regenerated field 10 or field 4 or both, stored in the even field sections of the storage elements 114 and 115. This data block is applied to the subtrahend input of the subtracter 108 wherein it is subtracted on a pixel by pixel basis from the corresponding block of pixel data from the current field 6 provided by the buffer memory 100. The differences or residues are then encoded in element 109 and the coefficients applied to element 110. The corresponding block vector is also applied to element 110. The motion vectors are variable length encoded in element 110. The coded vectors and coefficients are then transferred to the formatter 111. The encoded B fields are not inverse quantized and inverse transformed in element 112 since they are not used for subsequent encoding.

P fields are similarly encoded except that only forward motion vectors are generated. For example P field 16 is encoded with motion vectors associating corresponding blocks of I field 10 and P field 16. During encoding of P fields, element 112 provides corresponding decoded residues and element 107 provides the corresponding predicted P field. The predicted field and the residues are added in adder 113 on a pixel-by-pixel basis to generate the reconstructed field which is stored in the even field section of the one of storage elements 114 and 116 not containing the even field information from which the predicted even P field is generated. The reconstructed and stored even P field is used for encoding subsequent even B fields. For both P and B fields it should be noted that DCT's are performed on a block basis (e.g., a matrix of 8×8 pixels), but motion vectors are calculated for macroblocks (e.g., a 2×2 matrix of luminance of blocks or a 16×16 matrix of pixels).

Figure 4:
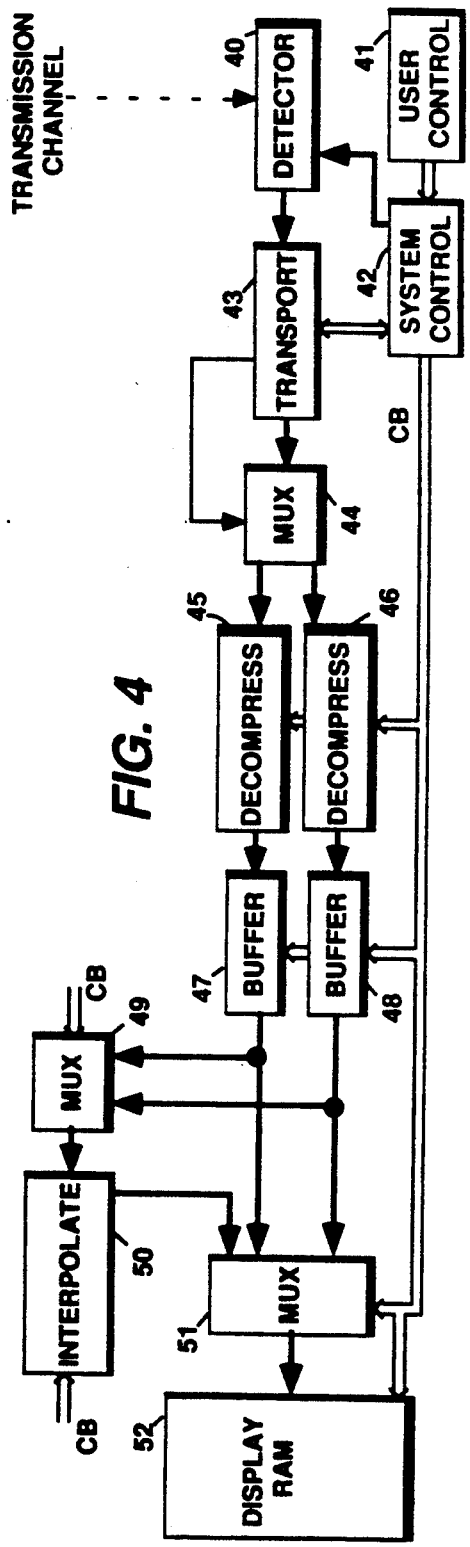
FIG. 4 is a block diagram of an exemplary video signal decoding system.

FIG. 4 illustrates an exemplary receiver apparatus for processing transmitted compressed video signal occurring as interleaved odd and even fields which have been independently encoded in sequences of intraframe and interframe encoding modes. The transmitted signal is detected by a detector 40 which may include a tuner, IF circuitry and a QAM demodulator. Detector 40 provides a signal in conformance with the signal provided by the transport packetizer 20 of FIG. 2. This signal is coupled to a transport processing circuit 43. Transport processing circuit 43 includes an error check/correction circuit, which, responsive to the error check codes appended to the transmitted signal, corrects signal errors incurred during transmission. If uncorrectable errors occurred a flag is generated and communicated to the receiver system controller 42. The transport processor 43, responsive to transport header information included in the transport blocks, identifies odd and even fields of data, and reconfigures the transmitted signal from transport block format, to a format which is in conformance with compressed information provided by the buffers 18 and 19 of FIG. 2. The reconfigured data is coupled to a multiplexer 44. A control signal, corresponding to the current field type (odd/even) is provided by the transport processor 43 to condition the multiplexer 44 to pass odd field data to a decompressor 45 and even field data to a decompressor 46. The decompressors 45 and 46 perform decompression of the odd and even field compressed video data respectively, and provide decompressed video signal to buffer memories 47 and 48.

In this example it is assumed that the compressed signal is of the form illustrated in FIG. 1C, but that the decompression circuitry 45 and 46 provide decompressed data reordered in the normal field sequence as per FIG. 1B, for example. The reordered fields from buffer memories 47 and 48 are coupled to a multiplexer 51 which, in the steady state with no loss or corruption of data, alternately couples odd and even fields of data to a video display RAM 52. It is assumed that the display RAM has sufficient storage capacity to hold one frame of data. Frames of data are thereafter read from the display RAM in either interlaced or non interlaced format for display purposes. The receiver apparatus is controlled by the controller 42 which is programmed to coordinate the decompression and display of received video data according to a normal cycle of operations.

Immediately after system turn-on or channel changes effected by user control 41, the system controller 42 initiates a start-up cycle to provide image reproduction as quickly as possible. Once image display of a full sequence of fields of data (a sequence encompassing two successive intraframe encoded mutually exclusive odd or even fields) has been accomplished, the controller switches to the normal decompression cycle of operation. At start-up, image reproduction cannot occur until at least one intraframe encoded field is received, since reproduction of intraframe encoded fields (P or B) require data from an intraframe encoded field. The controller 42 monitors the field types received responsive to header data provided by the transport processor 43. The controller precludes display of received field data until an intraframe encoded field is detected. Its field type (odd or even) is checked and decompression is performed on the successive fields of the same type as the first occurring intraframe encoded field. Display of fields of the opposite field type is forestalled until the occurrence of the first occurring intraframe encoded field of that type, which occurs a known number of fields after the detection of the first intraframe encoded field. At start-up, display of the first decompressed I frame may be repeated for the number of frame intervals between an I encoded field and the first B encoded field following the first P encoded field occurring after the I encoded field. Note in FIG. 1C, if field 10 is the first occurring I encoded field, the B fields 6 and 8 cannot be decoded without the prior P encoded field 4, (which is not available). The next even field to be displayed after the I field 10 in the normal display field sequence is field 12 which occurrs four frame intervals after field 10. Alternatively, rather than repeatedly displaying the first occurring I field the image display may be inhibited for e.g. four frames following the occurrance of the first I field.

During channel changes the system may be conditioned to repeatedly display the last image from the prior channel until the system has synchronized to display images from the newly selected channel.

Assume that the first intraframe encoded field is odd. Successive odd fields are decompressed and provided by the buffer memory 47 to the multiplexer 51. At this juncture several options are available regarding display of the received data. The first is to write the odd fields to the odd field lines of the display RAM 52, and to set the even field lines of the display RAM to an, e.g., intermediate gray value. and display the image. A second is to write the odd field data to the odd field lines of the display RAM, then read the same odd field data from the buffer memory 47 a second time, and write it to the even field lines of the display RAM, and display the image. The second option will provide a brighter image than the first option and with apparent greater resolution. A third option is to write the odd field data to the odd field lines of the display RAM, then to read the same field from the buffer memory 47 and apply same to an interpolator 50 via a multiplexer 49. The interpolator 50 may be arranged to generate interpolated lines of data from successive pairs of lines of the odd field signal (vertical averaging), thereby producing pseudo even lines of data which are subsequently written to the even field lines of the display RAM 52. This option will produce images which have apparent greater resolution than the second option.

The particular option employed is programmed into the controller 42, and is part of the start-up cycle. The controller, responsive to the data provided by the transport processor 43, controls the reading of the data from the appropriate buffer memory 47 or 48 (depending whether the first intraframe encoded field is odd or even) and controls the switching of the multiplexers 49 and 51. For example, considering the third option and assuming that the first intraframe encoded field is odd, the buffer memory 47 is conditioned to read each field of signal twice, the multiplexer 49 is conditioned to pass signal from buffer memory 47, and the multiplexer 51 is conditioned to alternately pass fields of signal from the buffer memory 47 and the interpolator 50. After a predetermined number of fields have been processed in this manner the controller switches to the steady state control cycle to decompress data from both odd and even field types.

As indicated earlier, the transport processor may provide error flags indicative of lost or uncorrectable errors. To ameliorate potential unacceptable image corruption from such errors or lost data, the controller may be arranged to condition the receiver system to substitute noncorrupted signal. For instance, if the lost or erroneous data occurs in an intraframe encoded field, the controller may be arranged to revert to processing similar to the above described option three (except that there is no need to wait for a first intraframe encoded field, assuming that the lost data only occurred in an odd or an even field; alternatively if data is lost in both odd and even fields, the controller will revert to the start-up cycle). If data is lost in a P field the controller may again be arranged to condition the system to operate as per option three. Alternatively, if data is lost from a B field, the controller may be arranged to condition the system to replace this data, on a single field basis, or partial field basis, with interpolated data as per options two or three.

Figure 5:
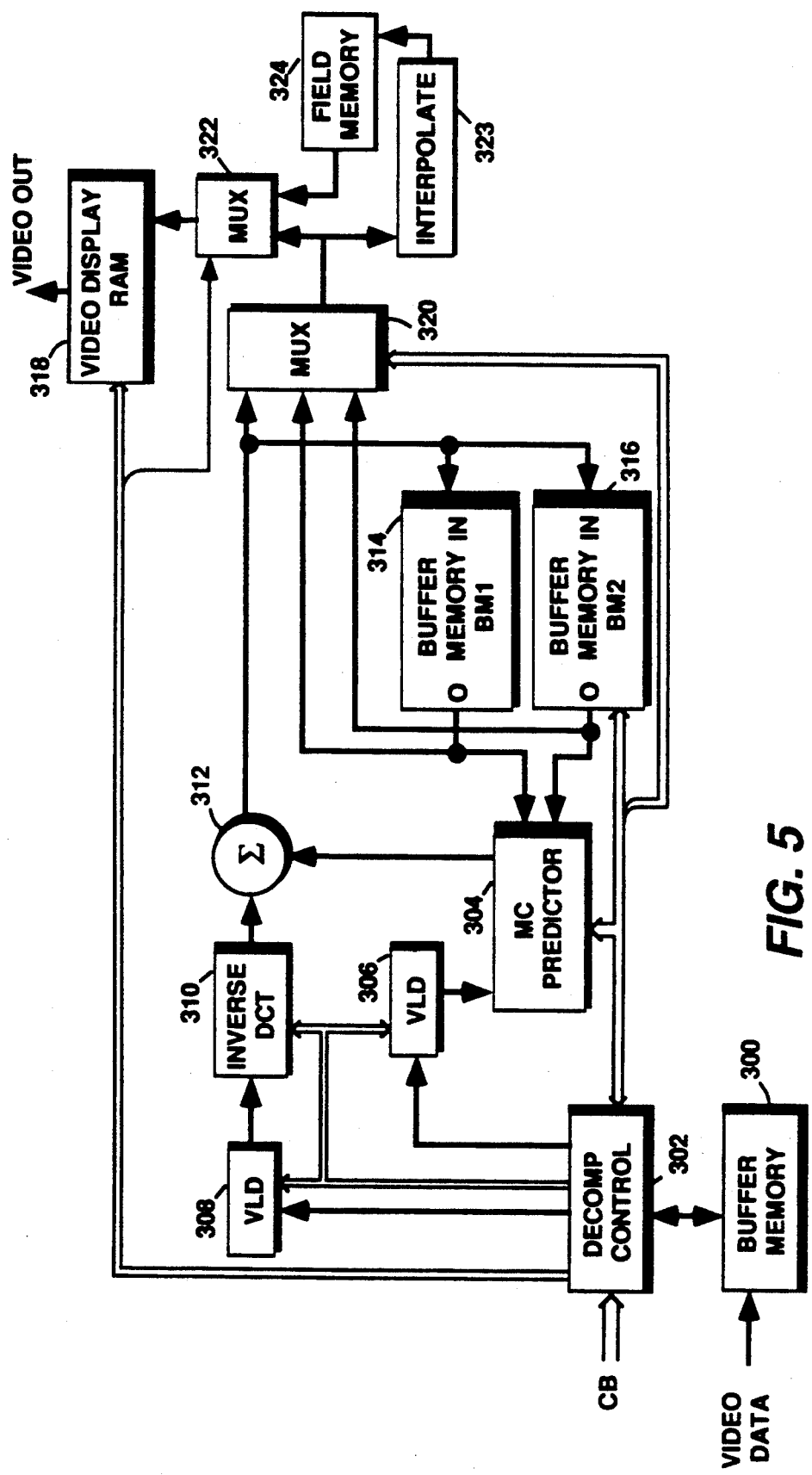
FIG. 5 is a block diagram of an exemplary video signal decompression apparatus.

FIG. 5 illustrates an exemplary arrangement of a single decompression apparatus for decompressing both even and odd field data.

Generally the circuitry of FIG. 5 is arranged to decompress video data provided in MPEG-like format. The apparatus includes two buffer memories 314 and 316, each of which has memory capacity to store an odd field and an even field of decompressed image data. When odd (even) fields are being decompressed the odd (even) field portions of the memories are enabled and vice versa. Decompressed data is provided by an adder 312, and is applied to a multiplexer 320 and the memories 314 and 316. When B fields are being decompressed, this image data is passed by the multiplexer 320 from adder 312 to the display RAM 318 (via multiplexer 322). When I or P fields are decompressed, the decompressed image data is written to one of the buffer memories 314 or 316, and passed to the display RAM after decompression of the subsequently occurring B fields (via multiplexers 320 and 322). In this way the transmitted field sequence is reordered to the normal field sequence. Nominally the multiplexer 322 is conditioned to pass image data from the multiplexer 320 to the display RAM 318. During intervals when error concealment is required, the multiplexer 322 is conditioned to pass image data from a field memory 324. Error concealment is provided according to the aforedescribed option three. As each field of data is provided by the multiplexer 320 an interpolated field of image data is generated from the current field and stored in the field memory 324 for substitution in whole or in part in the next occurring field. During start-up or channel changes, fields of data are alternately applied to the display RAM from the multiplexer 320 and the field memory 324.

Compressed video data from the transport processor 43 is applied to a buffer memory 300. This data is accessed by the decompression controller 302 wherein header data is extracted to program the controller 302. The variable length codewords corresponding to DCT coefficients are extracted and applied to a variable length decoder (VLD) 308 and the variable length codewords corresponding to motion vectors are applied to the variable length decoder (VLD) 306. The VLD 308 contains apparatus for performing variable length decoding, and inverse run length decoding as appropriate under the control of the controller 302. Decoded data from the VLD 308 are applied to an inverse DCT circuit 310 which includes circuitry to inverse quantize the respective DCT coefficients and to convert the coefficients to a matrix of pixel data. The pixel data is then coupled to one input of an adder 312, the output of which is coupled to the multiplexer 320 and the buffer memories 314 and 316.

The VLD 306 includes circuitry to decode the variable length encoded motion vectors under the control of the controller 302. Decoded motion vectors are applied to a motion compensated predictor 304. Responsive to the motion vectors the predictor accesses corresponding blocks of pixels stored in one (forward) or both (forward and backward) of the buffer memories 314 and 316. The predictor provides a block data (from one of the buffer memories) or an interpolated block of data (derived from respective blocks from both buffer memories) to a second input of the adder 312.

Decompression is performed as follows. If a field of input video data is intraframe encoded there are no motion vectors and the decoded DCT coefficients correspond to blocks of pixel values. Thus for intraframe encoded data the predictor 304 applies a zero value to the adder 312 and the decoded DCT coefficients are passed unaltered by the adder 312, to the one of the buffer memories 314 and 316 not storing the last decompressed P field, for decoding subsequent motion compensated frames (B or P).

If a field of input data corresponds to a forward motion compensated P field, the decoded DCT coefficients correspond to residues or differences between the present e.g. even field and the lastmost occurring even I or P field. The predictor 304 responsive to the decoded motion vectors accesses the corresponding block of I or P field data stored in either buffer memory 314 or 316 and provides this block of data to the adder wherein the block of residues are added to the corresponding block of pixel data provided by the predictor 304. The sums generated by the adder 312 correspond to the pixel values for the respective blocks of the P field, which pixel values are applied to the one of buffer memories 314 and 316 not storing the I or P field of pixel data utilized to generate the predicted pixel data.

For bidirectionally encoded (B) fields the operation is similar, except that predicted values are accessed from the stored I and P pixel data stored in both buffer memories 314 and 316 depending upon whether the respective motion vectors are forward or backward vectors or both. The generated B field pixel values are applied via the multiplexer 320 to update the display RAM 318, but are not stored in either of the buffer memories 314 and 316, as B field data is not utilized for generating other fields of picture data.

During start-up and channel changes the image latency may be shortened with insignificant image errors. Assume that field 10 (FIG. 1C) is the first occurring I field after start-up or channel change. In order to decompress the subsequent B fields 6 and 8 a decompressed P field 4 is required, which of course is not available. However it is generally assumed that successive fields/frames of image data are significantly redundant. Thus decompressed I field 10 should be similar to decompressed P field 4 and may be substituted therefor. This is accomplished simply by writing the first decompressed I field to both of the memories 314 and 316. Thereafter B fields 6 and 8 may be decompressed and displayed.

The controller 302 is programmed to cycle the particular processing elements according to the particular sequence of received odd and even fields. It is also programmed with start-up and channel change sequences which are initiated responsive to control signals provided on the control bus CB from the system controller. During start-up, display is inhibited until the reception of the first I field. Its type (odd/even) is determined from the header data provided in the received signal, and responsive to the type data, only the odd or even fields are provided to the multiplexer 320 for a predetermined number of field intervals. During this period the multiplexer 322 is conditioned to switch at the field rate to provide fields of real image data provided by the multiplexer 320 interleaved with interpolated fields of data provided by the field memory 324. During channel changes the system may be conditioned to operate in similar fashion, or rather than inhibiting display until reception of an I field, may provide a frozen display of data stored in the display RAM from the lastmost received channel.

The interpolator has been described as a spatial interpolator which averages lines within a particular field. It should be appreciated that the interpolator may be arranged to generate temporally averaged data from the current field and a prior field of the same type (odd or even).

Global concealment of intermittent data loss, indicated by the error indications provided by the transport processor 43 may be implemented by simply conditioning the system to enter the channel change mode of operation. Concealment of this type will introduce jerkiness and other display artifacts. However if the data lost or corrupted occurs in a B field, the B fields may be substituted with interpolated fields without significant disturbance to the displayed image.

Figure 6:
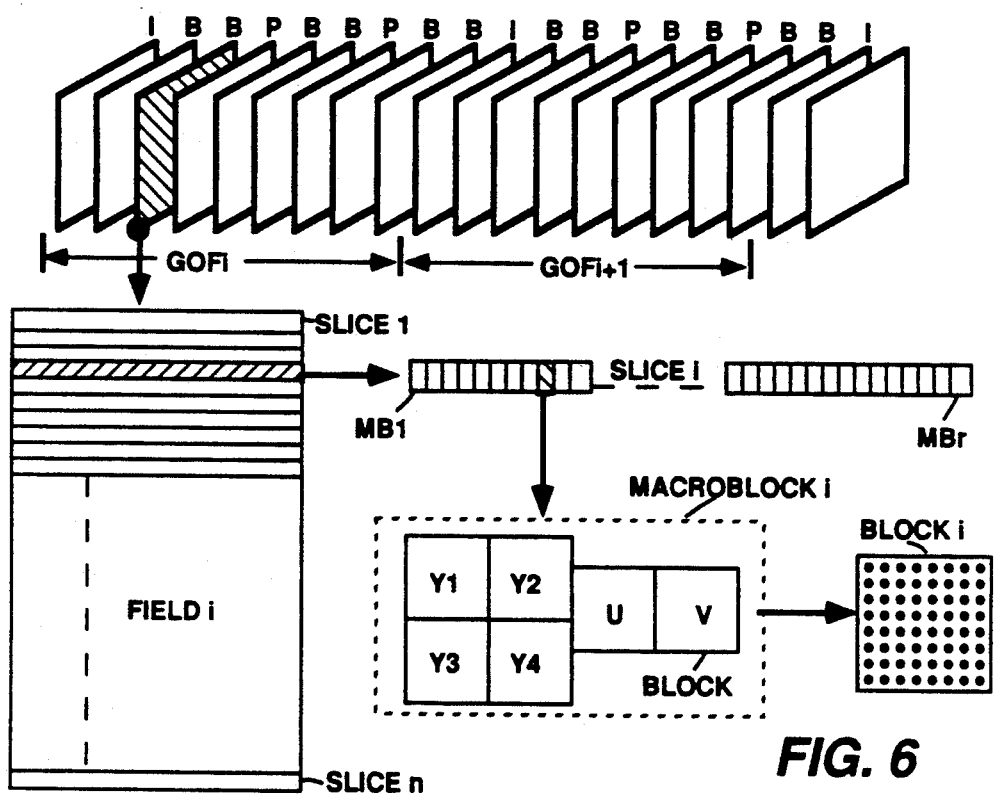
FIG. 6 is a pictorial representation of compressed signal format.

Refer to FIG. 6 which illustrates the coding hierarchy of the compressed signal. At the top level the compressed signal is provided as groups of fields GOFi (odd or even), each of which includes at least one I field. Each field is divided into slices. A slice includes a plurality of macroblocks. Each macroblock comprises both luminance, Y, and chrominance ,U,V, data. This data is arranged in blocks with each block comprising information from an $8 \times 8$ array matrix of image pixels. As such each macro block includes information from 16 adjacent field lines of the encoded image. Where appropriate the macroblocks also include motion vectors and other indicia required for decoding.

For purposes of discussion assume that the transport packetizer 20 applies error detection codes to the compressed data on a slice basis so that transmission errors may be detected limited to at least respective slices. Given this data configuration, localized error concealment may be performed in the receiver on a slice basis. Note however, that if an error occurs in a slice of an I or P field, this error may propagate through the remainder of the GOF. Thus when error concealment is performed, attention must be paid to the type of field in which the error occurred.

Figure 7:
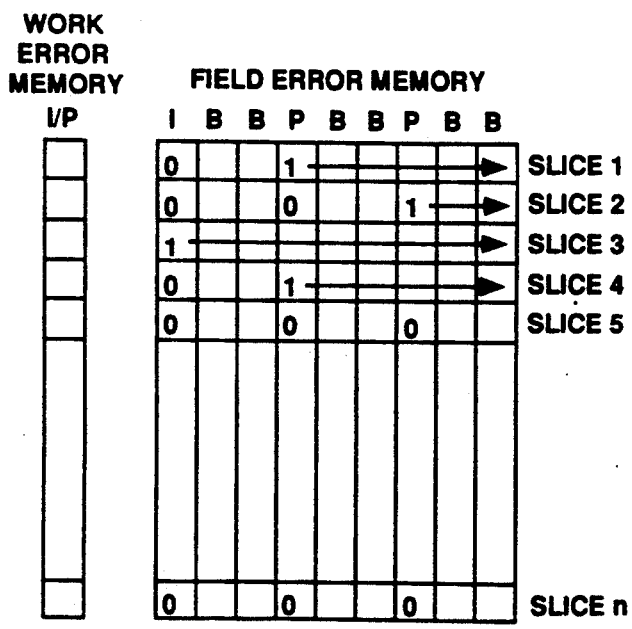
FIG. 7 is a pictorial representation of a field error memory useful for describing the invention.

In the receiver the system controller 42 may include an error memory for storing error indications of respective slices of respective fields, which error indications are provided by the transport processor 43. Consider FIG. 7 which illustrates an error memory (included within the system controller 42) having sufficient capacity to store slice error data for a GOF. Each column of the field error memory represents slice error data for a particular field in the GOF. The type of each respective field is indicated by the letters I,B,P at the top of each column. Consider column 1 which contains error data for an I field of the GOF. A "1" in a memory location indicates that an error was detected in a corresponding slice and a "0" indicates absence of errors. An error has been indicated in slice 3. This error may propagate through all the remaining fields in the GOF during decompression. Thus the error indication must be propagated in the error memory, if proper error concealment is to be provided. The error indication propagation is indicated by the arrow in slice 3 from column 1 to column 9. Similarly propagation of error indications for P fields is indicated by respective arrows in the memory. (The memory bank was not fully populated with ones and zeros to avoid confusion.)

Propagation of error indications in the field error memory may be accomplished with the use of an additional working memory designated I/P. In general terms, the I field slice error data is loaded in both the I field portion of the field error memory and in the I/P memory. As B field slice error data is generated it is ORed with the corresponding slice error data in the I/P memory, and the result loaded in the respective B field portion of the field error memory. As subsequent P field slice error data is generated, this data is ORed with corresponding slice data in the I/P memory, the results are loaded in the respective P field portion of the field error memory, and the results are also used to replace corresponding slice error data in the I/P memory. In this fashion both I and P field slice error data is propagated through respective fields of the field error memory for a GOF.

Figure 8:
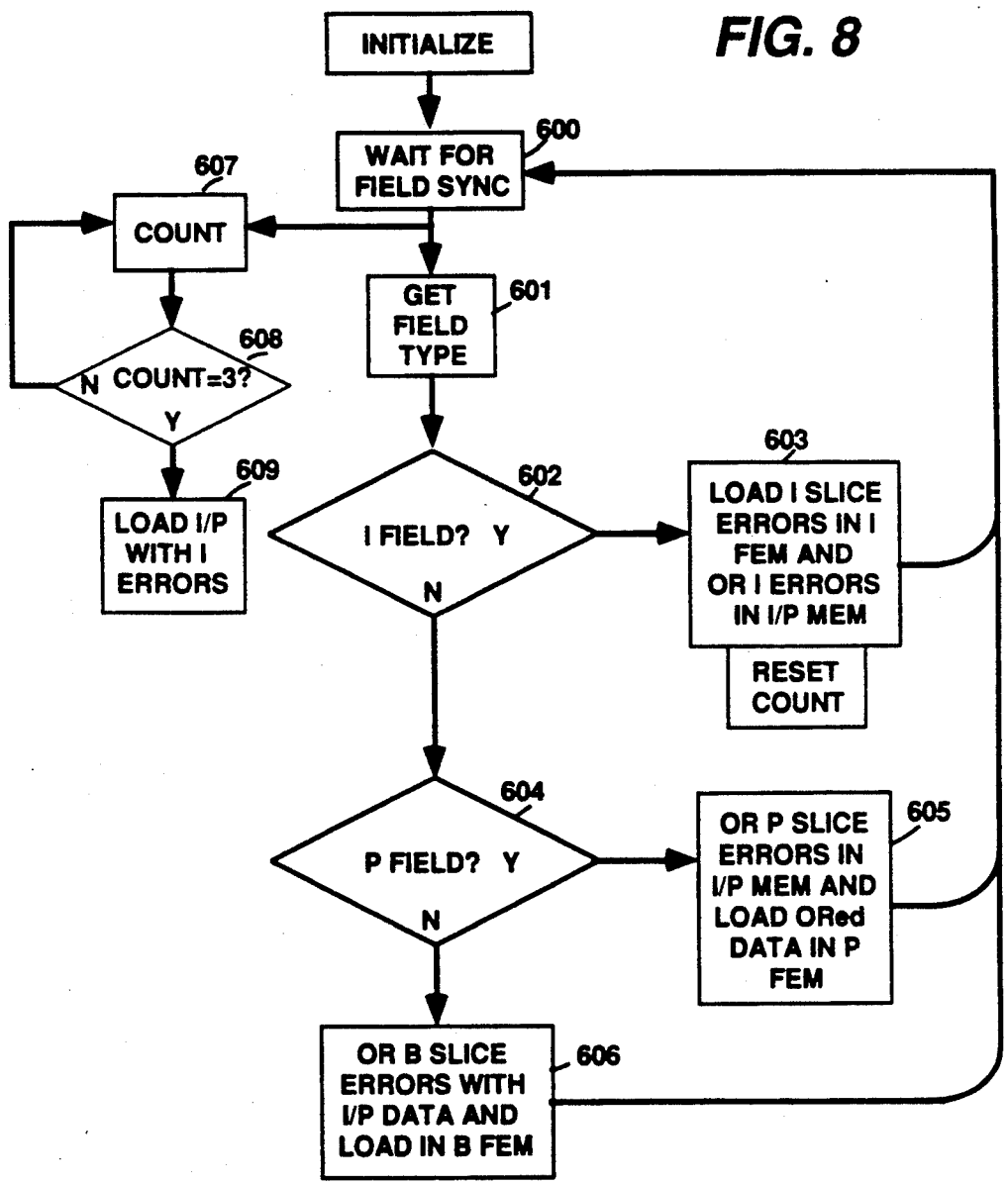
FIG. 8 is a flow chart of an exemplary process for generating an image signal error map.

FIG. 8 shows a flowchart of the process for generating the error map. Respective error maps are generated for both odd and even groups of fields, however the flow chart shows the process for generating a map for only an odd or even GOF. Typically this process is initialized by entering the steady state decompression cycle. Once initialized the system waits for a field synchronization pulse 600, and then reads the field type data in the header of a transport packet 601. The field type is examined 602 to determine if it is an I encoded field. If it is an I field, a counter 607 is reset to zero, and slice error indications are loaded into the I portion of the field error memory (FEM), and is ORed with corresponding slice error data in the I/P memory. The results of ORing are substituted in the I/P memory (603). Note that the I/P memory is not loaded with I field slice error data on the occurrence of an I field because e.g. two subsequent B fields from the previous GOF are yet to be decompressed. I field error data is substituted in the I/P memory after reception of these B fields. This is accomplished by counting (607) field synchronization pulses, and when the appropriate number of fields (608) have occurred after the reception of an I field, the slice error data for that I field is read from the FEM to the I/P memory (609).

If the received field is not an I encoded field it is checked (604) to determine if it is a P encoded field. If it is a P encoded field, the slice error data is ORed (605) with corresponding slice error data in the I/P memory, and the results are loaded in both the I/P memory and the appropriate P field portion of the FEM. If the received field is not a P encoded field, by default it is a B encoded field. The slice error data is ORed (606) with the corresponding slice error data in the I/P memory, and the results are loaded in appropriate B field locations of the FEM.

The foregoing process for generating error maps provides error data which permits concealing errors which propagate temporally in a group of frames and horizontally within a slice. However, it should be realized, that due to image motion, errors may also propagate vertically within successive fields. Concealment of vertical error propagation may be accomplished by vertically spreading the slice error data. For example, if a slice error occurs in slice 3 of e.g. I field 1, this error indication may also be included in memory error locations corresponding to slices 2 and 4. Typically, for most images, motion occurs predominantly in the horizontal direction with only slight motion in the vertical direction. Thus, vertical error propagation may generally be ignored with only very slight and insignificant consequent image corruption.

The error map data is provided to e.g. the decompression controller 302 and responsive thereto conditions the multiplexer 322 to substitute interpolated slices from the prior field to the display RAM 318, for current slices of decompressed image data which have been indicated to contain errors.

Figure 9:
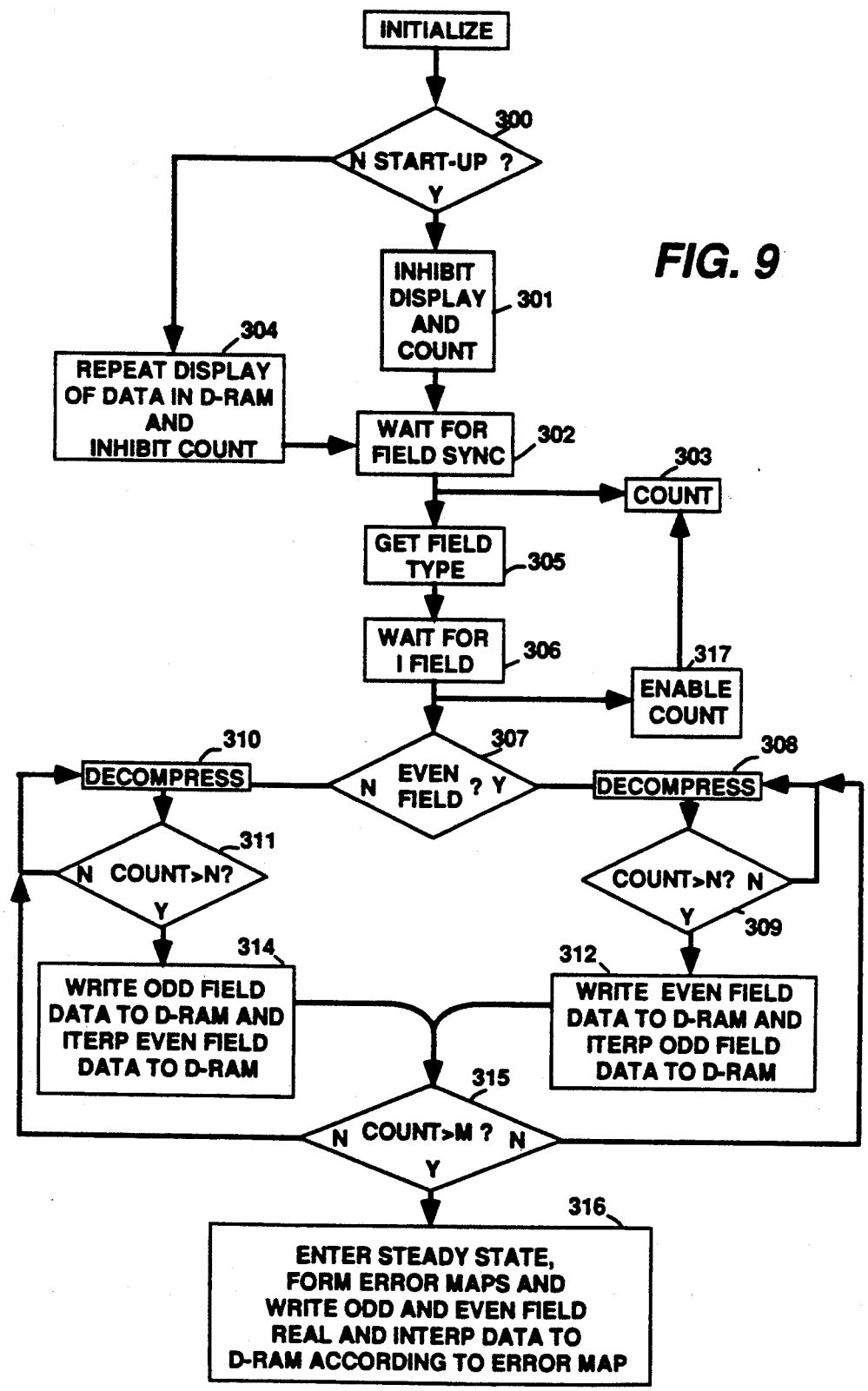
FIG. 9 is a flow chart of the start-up sequence of the FIG. 5 apparatus.

FIG. 9 illustrates a flow chart of an exemplary start-up/channel change sequence for the system controller 42. During start-up or channel changes flags are generated. These flags are examined (300) to determine whether start-up or a channel change is to be effected. If the start-up mode is requested, display of image data is inhibited and a field counter 303 is disabled (301). Alternatively if a channel change is requested, the display apparatus is conditioned to repeatedly display image data contained in the display RAM, and the field counter 303 is disabled. The system waits (302) for the next field synchronization pulse, and when it occurs, transport header data is examined (305). The system waits for the occurrence of an I encoded field (306), which field is examined for its odd/even field type (307). At the occurrence of an I field the counter 303 is enabled. If the I field is an even field it is decompressed, but not written to the display RAM until the reception of a predetermined number, N, of fields (309). The number N is established to conform to the delay interval between reception of an I field and the time required to provide continuous decompressed fields. After reception of N fields, the decompressed data is written to the display RAM, and the display mode is enabled (312). In addition interpolated odd fields, generated from the decompressed even fields are written to the display RAM. This mode continues until M fields have been received (315), at which time the steady state decompression mode (316) is activated. The number M is selected as the number of fields after the occurrence of an even (odd) field that valid decompressed odd (even) field data will be available. For example, with respect to FIG. 1C, the number M will be equal to N+9 fields.

Similarly if the first detected I encoded field is odd (307), a similar process (310, 311, 314, 315, 316) is followed.

The system follows a similar sequence if a channel change is requested with the only difference being that the display is not inhibited. At control points 312 or 314, since the display has not been inhibited, when new data is written to the display RAM, image change is automatic.

What is claimed is:

1. Apparatus for receiving and decompressing compressed image data of the type wherein odd and even fields of image data are independently compressed according to respective sequences of interframe and intraframe encoding modes, said apparatus comprising means for independently decompressing said compressed odd and even fields of image data; and means for substituting odd field data for even field data when valid even field data is not available.

2. The apparatus set forth in claim 1 including means for receiving a plurality of signals conveyed in respective channels, each of said signals including compressed image data, said means for receiving, responsive to user control, for selecting signal from one of said channels, said apparatus including means for providing an image representative signal from decompressed image data from only one of said even or odd field data for a predetermined interval after user induced selection of a channel different from a channel previously selected, and thereafter providing an image representative signal from decompressed image data from both of said even or odd field data.

3. The apparatus set forth in claim 1 further including:

means responsive to received signal for passing compressed odd fields of image data to a first connection and even fields of compressed image data to a second connection;

first decompression means coupled to said first connection for providing odd fields of decompressed image data;

second decompression means, coupled to said second connection, for providing even fields of decompressed image data; and means coupled to said first and second decompression means, for providing an image representative signal including interleaved fields of decompressed odd and even fields of image data.

4. The apparatus set forth in claim 3 further including:

means responsive to received compressed image data for detecting errors in said compressed image data, and providing error indicating indicia; and wherein said means for providing an image representative signal including interleaved fields, includes means responsive to decompressed odd and even fields of image data and said indicia, for substituting data derived from odd and even fields for image portions represented by even and odd field image data corresponding to said errors.

5. Apparatus for decompressing transmitted compressed image data of the type wherein odd and even fields of image data are independently compressed according to respective sequences of interframe and intraframe encoding modes, said apparatus having a start-up mode and a steady state mode, said apparatus comprising:

means for detecting said transmitted compressed image data;

means, responsive to detected compressed image data, for generating indicia indicating whether fields of compressed image data are odd or even and intraframe encoded or interframe encoded;

means, responsive to detected compressed image data, for mutually independently decompressing sequences of odd field compressed image data and sequences of even field compressed image data;

means, responsive to said indicia and decompressed odd and even field image data, for composing an image representative signal of decompressed odd and even field image data in said steady state mode, and in the start-up mode composing an image representative signal, for a predetermined interval, of decompressed image data from fields of only one of decompressed odd fields or even fields of data, said one of decompressed odd fields or even fields of data being the odd or even fields of data corresponding to the sequence of interframe and intraframe encoded compressed image data having the first received intraframe encoded field of compressed image data.

6. The apparatus set forth in claim 5 further including:

means responsive to said one of decompressed odd fields or even fields of data for generating interpolated fields of data, and wherein said means for composing an image representative signal in the start-up mode, composes an image representative signal from said one of decompressed odd fields or even fields of data and said interpolated fields of data.

7. The apparatus set forth in claim 6 further including:

means, responsive to detected compressed image data, for detecting data loss or errors in received data; and wherein said interpolating means, in the steady state mode generates interpolated odd/even fields of data from even/odd fields of decompressed data, and said means for composing substitutes interpolated odd/even field data for image representative data corresponding to odd/even field data for which data loss or errors have been detected.

8. The apparatus set forth in claim 5 wherein said means, responsive to detected compressed image data, for mutually independently decompressing sequences of odd field compressed image data and sequences of even field compressed image data comprises:

means, responsive to said detected compressed image data, for passing compressed odd fields of image data to a first connection and even fields of compressed image data to a second connection;

first decompression means coupled to said first connection for providing odd fields of decompressed image data;

second decompression means, coupled to said second connection, for providing even fields of decompressed image data; and means coupled to said first and second decompression means, for providing an image representative signal including interleaved fields of decompressed odd and even fields of image data.

9. The apparatus set forth in claim 8 further including:

means responsive to said one of decompressed odd fields or even fields of data for generating interpolated fields of data, and wherein said means for composing an image representative signal in the start-up mode, composes an image representative signal from said one of decompressed odd fields or even fields of data and said interpolated fields of data.

* * * * *